July 8, 1969    J. E. BOURNE ET AL    3,454,852
REDUNDANT SERVO CONTROL SYSTEM WITH CROSSFEEDING OF
FEEDBACK FOR USE IN AN AUTOPILOT
Filed Jan. 14, 1966    Sheet 1 of 3

INVENTORS
JOHN E. BOURNE
JOHN A. SIMPSON
BY
ATTORNEY

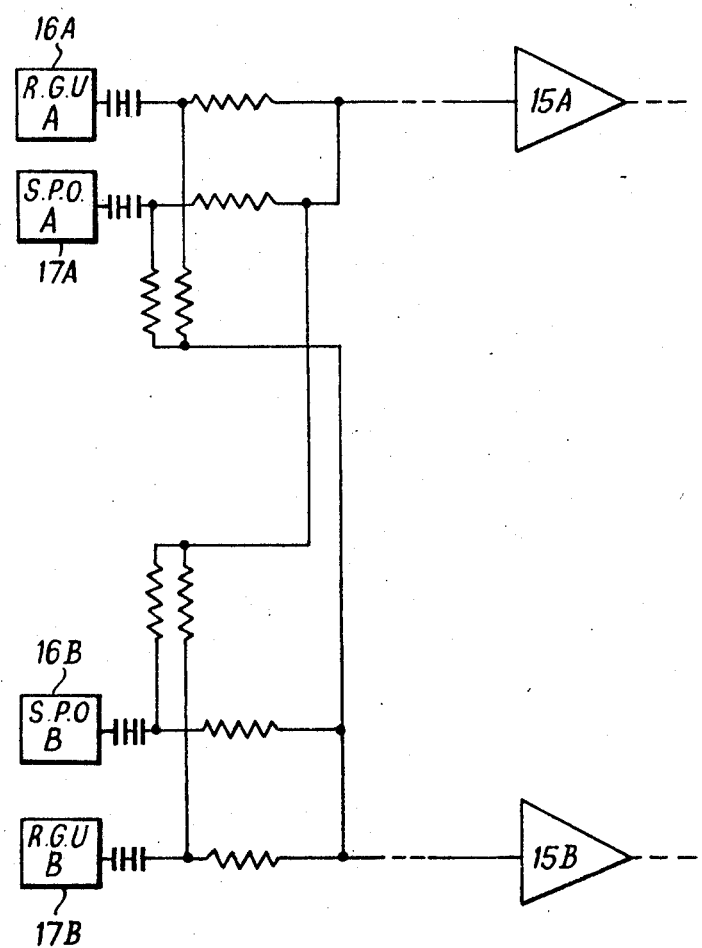

United States Patent Office 3,454,852
Patented July 8, 1969

3,454,852
REDUNDANT SERVO CONTROL SYSTEM WITH CROSSFEEDING OF FEEDBACK FOR USE IN AN AUTOPILOT
John Edward Bourne, Wokingham, and John Albert Simpson, Shere, near Guildford, England, assignors, by mesne assignments, to Sperry Rand Limited, London, England, a company of England
Filed Jan. 14, 1966, Ser. No. 520,762
Claims priority, application Great Britain, Jan. 25, 1965, 3,128/65
Int. Cl. G05b; H02p 1/54, 5/46
U.S. Cl. 318—18
4 Claims

ABSTRACT OF THE DISCLOSURE

An actuator system particularly adapted for use in connection with manual control of aircraft which comprises two actuator channels, both channels being responsive to a signal input and both contributing to the mechanical output of the actuator system, in which position feedback signals are cross-feed between the two channels as well as directly back as part of the signal input of the channel embodying the feedback signal generator so as to effect compensation at least in part by one channel for failure to some extent in the other channel.

---

Figure 1:
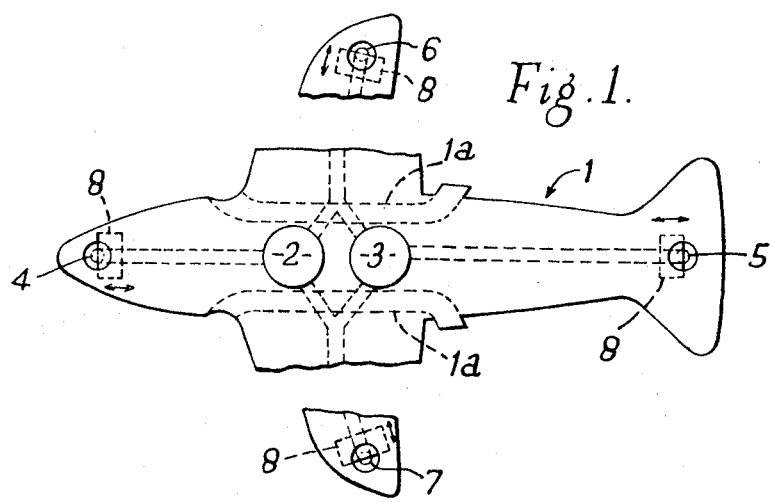

This invention relates to an actuator system by which a source of control signals is linked to operate a member that it is to be controlled. In particular, but not exclusively, it relates to aircraft and other dirigible craft in which the pilot is required to position control surfaces manually but in which an automatic control signal supplements the pilot's control, so that this automatic control may at times either adjust or replace the efforts of the pilot.

Normally, the automatic control signals are fed to the actuator system, and to ensure that the apparatus is fail-safe—i.e., that if the automatic control fails then the apparatus is at once under the full manual control of the pilot—the actuator system normally comprises either two or three actuator channels arranged in parallel. Two actuator channels in parallel are said to constitute a duplex actuation system, while three are said to constitute a triplex system. With a triplex system, should one of the three actuator channels fail, it will be overcome by the other two and automatic control may continue until a second actuator channel fails, when the automatic control system must be disengaged and the pilot has to take over fully manual control. With a duplex system any disparity between the operation of the two actuator channels is normally noted by a comparator, and is taken to indicate that at least one of these channels must be faulty. The automatic control system is then at once disconnected and the pilot takes over fully manual control.

The invention provides an actuator system including two actuator channels in parallel, each channel having an actuator, means for producing a feedback signal which is a function of the actuator setting, and means for applying an automatic command signal to vary the setting of the actuator, which automatic command signal is an algebraic sum of a control signal, the feedback signal of the respective channel and the feedback signal of the other channel, whereby under most failure conditions the actuator system can continue to operate nearly normally.

Preferably, the actuators comprise parallel extendable links in a linkage between a manual control and a member or members that is to be controlled, whereby the extensions of the actuator and the position of the manual control can affect the position of said controlled member.

Said control signal may comprise the algebraic sum of a signal related to the position of said manual control and a signal related to the manoeuvre rate of the aircraft or other dirigible craft.

In one use, the actuator system is mounted in an aircraft between the pilot's stick and the aircraft control members, and said signal related to the aircraft manoeuvre rate is derived from a rate gyro measuring the movement of the aircraft in the sense affected by said control members, and said signal related to the position of said manual control is derived from a pilot's stick pick-off.

Figure 2:
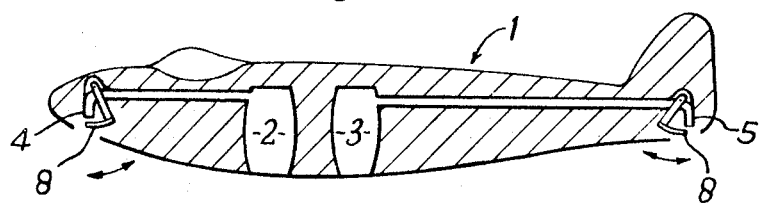

An actuator system according to the present invention will now be described, by way of example, with reference to the accompanying drawings in which:

FIGURE 1 is a diagrammatic underneath plan of a VTOL aircraft;
FIGURE 2 is a diagrammatic longitudinal section through the aircraft of FIGURE 1,
FIGURE 3 is a schematic circuit drawing of the transmission system, and
FIGURE 4 is a circuit sketch of another part of the transmission system.

The system to be described is used to stabilise a VTOL aircraft when hovering. FIGURES 1 and 2 show a VTOL aircraft 1 with forward thrust engines 1a, two lift engines 2, 3, "puffer nozzles" 4, 5, situated at the end of the fuselage and similar nozzles 6, 7, at the ends of the wings. About 8 percent of the power of engines 2, 3 is bled from them and fed to nozzles 4, 5, 6 and 7. The engines provide all the downward thrust necessary to hold the weight of the aircraft as it hovers; by regulating the nozzles the aircraft is then stabilised against disturbances in pitch, roll and yaw disturbances. Flaps 8 are pivotally mounted over the nozzles, and the thrust exerted by any one nozzle may be varied by pivoting the flap so as to vary the obstruction it presents to the nozzle. A tendency to pitch may be countered by differentially varying the obstruction of nozzles 4, 5, while a differential variation of the obstruction at nozzles 6, 7 will counter a tendency to roll. A tendency to yaw is best met by the different procedure of pivoting some or all the nozzles themselves so that they exert a couple on the aircraft about a vertical axis.

Figure 3:
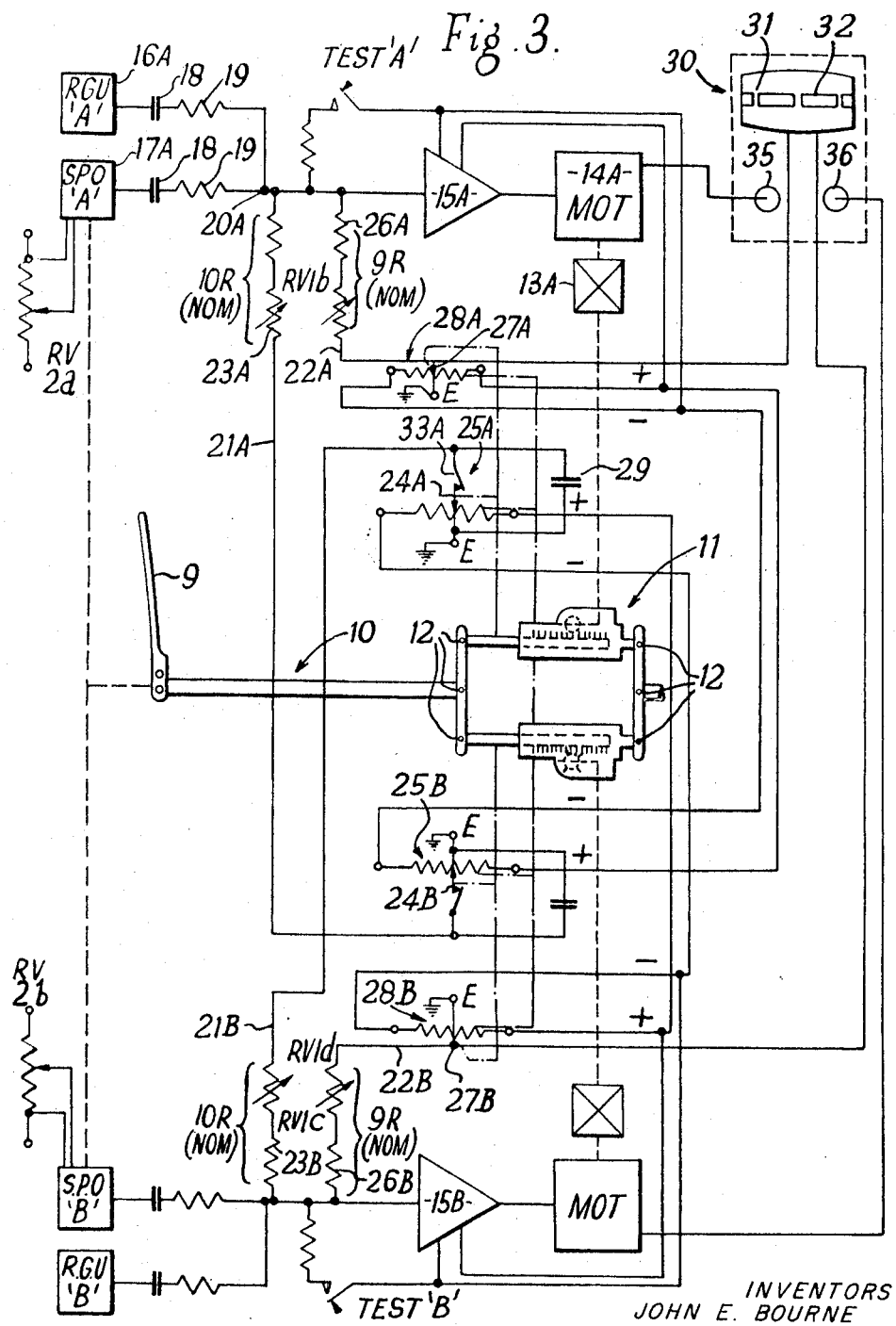

FIGURE 3 shows a stick 9, operable manually by the pilot, and part of a transmission linkage 10, mechanically linking this stick with mechanism (not shown) which operates to swivel the flaps 8 at nozzles 4, 5, for example, simultaneously and in opposite senses. By movement of the stick 9, therefore, the pilot exerts a torque upon the hovering aircraft about a transverse axis to counteract a tendency to pitch. The stick 9 is also used by the pilot to operate conventional aircraft control surfaces (not shown) and so control the aircraft in forward flight. When the aircraft is hovering, movements of the stick swivel the flaps 8 and move the conventional control surfaces as well, but the latter will not have any effect upon the craft since there is no air flow over them. When the aircraft is flying forward the lift engines 2, 3 are shut off so that the nozzles emit no jets, and movements of flaps 8 are ineffective.

Two ram actuators A and B are mounted in parallel in the transmission linkage, forming part of a rectangular framework 11 in which all the connections 12 are pivot points. If the two actuators A and B are maintained of constant length, then the framework 11 is in effect as rigid as the rest of the transmission linkage 10 and the pilot has full manual control over the setting of nozzles 4, 5. Should one or both actuators be moved so that its length alters, the effect upon the transmission linkage will be to increase or decrease its total length in a manner proportional to the average of the movements of both actuators, having regard both to magnitude and to sign. Thus if the actuators move in unison the resultant extension of the transmission linkage 10 as a whole will equal that of each actuator. If the actuators make similar movements in opposite senses the resultant effect upon the length of the transmission linkage as a whole will be nil. If one actuator is moved and the other is not, the resultant change in length of the transmission linkage will be half that of the moved actuator and in the same sense.

It will be apparent that FIGURE 3 is very nearly symmetrical about an imaginary line drawn across it half way down, and henceforth numbers will be followed by A or B when specific reference to one or other half of the drawing is intended. Otherwise the reference should be taken generally as applying to both halves of the figures.

Each actuator comprises a rack and pinion or the like, driven through gearing 13 by a motor 14 the operating signal of which is the output of an amplifier 15. The input to the amplifier comes from a rate gyro unit 16 and a stick pick-off 17, these two sensors being arranged in parallel and their outputs being fed via condensers 18 and resistors 19 to a common point 20. Feedback to the amplifier 15 is supplied via two leads in parallel 21 and 22. Lead 21 contains a resistor 23, nominal value 10R, and is connected to the wiper 24 of potentiometer 25 of the other half of the figure. Lead 22 contains a resistor 26, nominal value 9R, and is connected to the wiper 27 of potentiometer 28 of the same half of the figure. The resistors of potentiometers 28A and 25A are mounted on the body of actuator A, while the wipers of these potentiometers are mounted on a movable rod 27A of the same actuator. The resistors and wipers of potentiometers 28B and 25B are similarly mounted on actuator B. The mountings of resistors and wipers on actuator bodies and rods respectively are indicated diagrammatically by dotted lines in FIGURE 3. Potentiometers 25 and 28 are all centre-tapped to earth, 28A and 25B derive positive and negative supplies from amplifiers 15A, and 28B and 25A receive similar supplies from 15B. Potentiometers 25 are therefore cross-coupled and 28 are straight-coupled, as already defined. The wiper and centre-tap of each one of the cross-coupled potentiometers 25 are connected via a condenser 29.

The automatic system comprising the sensors, feedback system and actuators A and B may be used to supplant the control of the pilot and thus put the aircraft under fully automatic control. More usually, however, it supplements the actions of the pilot. When the aircraft becomes subject to a transient disturbing force, the rate gyro units 16 put out electrical sinals proportional to the rate at which the craft is changing attitude in response to the force. The pilot, noticing the motion of the aircraft, operates the stick so as to counteract the force. If he moves the stick exactly correctly, the output of the stick pick-off 17 will be exactly equal and opposite to that of the rate gyro unit 16 so that the signals cancel, no signal is applied to amplifier 15 and neither actuator will move. If the pilot fails to give quite the correct movement to the stick, however, the small unbalance between the outputs of 16 and 17 will allow a small signal to amplifier 15, and the actuators will move to reduce the small signal to zero, as described hereafter.

Consider the system operating in full working order. The aircraft is hovering at a steady attitude and the movable parts of the system are positioned as shown in FIGURE 3. Now a transient disturbing force causes say the pitch angle to change. Assume that this gives rise to a resultant small signal at common point 20, indicating that the pilot has failed to counteract the disturbance perfectly by his own movements of the stick. This signal passes to amplifier 15, the output of which drives motor 14 and thus moves the associated actuator rod through gearing 13. The two actuators A and B therefore start to extend or contract in unison, and when this happens they move their associated potentiometer sliders (27A and 24A, 27B and 24B respectively) in unison also, away from the centre tapping points in the sense such as to produce feedback to oppose said small signal. Feedback signals therefore start to arrive at amplifiers 15A and 15B; that for 15A is the resultant of the signals in the two parallel leads 21A and 22A and that for 15B comes similarly from leads 21B and 22B. If the potentiometer taps (24B, 27A, 24A and 27B) from which these leads derive their potentials were all displaced equally from centre, then the potentials across these leads would all be equal too. Were the four leads to contain resistors of equal size, then it would theoretically be possible to reach equilibrium with actuators A and B in dissimilar attitudes and with each of the parallel feedback leads carrying a considerable current, one of positive sign and the other negative. However, since the resistors in leads 21, 23 are unequal, any attempt to bring about a state of equilibrium in which the currents in either pair of leads 21 and 23 are equal in magnitude but opposite in sign will be in vain, since this would require, say, a greater voltage across resistor 23A than across 26A, and corresponding voltages will then also occur across resistors 26B and 23B respectively, giving rise to a finite feedback to amplifier 15B.

By the time equilbrium is reached it will be assumed that the transient disturbing force has disappeared, so that the system comes to rest with stick and actuators set exactly as they were before the disturbance arose, with zero feedback signals in leads 21 and 22. It will be apparent that the rate gyro units 16 put out a signal only when there is a rate of change in the attitude of the craft. By reason of this and the condensers in the outputs of 16 and 17, the automatic system is unsuitable for counteracting long-term steady disturbing forces. These can only be opposed by the pilot moving the stick. Nevertheless, should the pilot have to move this stick to a new datum to counteract a persistent disturbing force, any transient disturbances that then superimpose themselves upon the persistent force will evoke a response from the system as readily as if the stick datum had remained unchanged.

In a first example of partial failure of the system to be considered, one actuator (say A) runs hardover to one end of its travel. Say that it runs to its position of maximum extension and jams there. This will carry the wipers 24A, 27A to the far negative ends of their potentiometers 25A, 28A. A large feedback signal of negative polarity will therefore be fed to amplifier 15A by way of lead 22A, but cannot move motor 14 since actuator A has jammed. However, a correspondingly large feedback signal will pass from cross-coupled potentiometer 25A to amplifier 15B by way of lead 21B, and in order to restore the total feedback of amplifier 15B to zero actuator B travels in the opposite direction, (i.e. contracts) carrying the wipers 24B, 27B of potentiometers 25B, 28B towards the positive ends of their travel. Wiper 27B need not go quite hard over, since the potential it taps is only put across resistor 26B (9R) while the potential that is to be matched is developed across resistor 23B (10R). As a result, when there is no input signal from 16 and 17, the system will stabilize with actuator A out of action and fully extended, actuator B serviceable and nine-tenths fully contracted, and the resultant length of the transmission link 10 very nearly what it would be if both actuators were working properly.

An indicator 30 comprises two indicator bars 31, 32, driven by motors responsive to the voltages at 27A, 28B respectively. If these are the same, as they should normally be, the two bars will lie level with each other. If they are not, this is an indication that the system is defective for a reason such as that which has just been described or as those which follow. The pilot then has the choice of disconnecting the automatic system and controlling the aircraft manually, or leaving the automatic system in operation knowing that it will still work but not so effectively as before. If the pilot chooses to leave the system working after actuator A has run hard over as described, he may open switch 33A, so earthing the lead 21B through condenser 29A. Thereafter, since the entire feedback current of amplifier 15B has to pass via lead 22B, potentiometer 28B has to develop about twice the potential it did before, in order to counteract input signals from 16B and 17B. Therefore the movements of actuator B have to be on approximately twice the previous scale. Thus with actuator A stationary and B working on about twice the normal scale in response to operating signals, the linkage 10 as a whole responds to the signals with movements equal to the average between the movements of the two actuators, i.e. with movements about equal to those it would make if the two actuators were both working properly. Nevertheless, the maximum change in length of linkage 10 (the stroke) will be reduced to about half of what it was.

Another type of failure of the system will now be descirbed. Say the wiper 27A of the straight-coupled potentiometer 28A goes open circuit and that the input signals from 16, 17 are positive. Since the wiper 27A is open circuit, the remaining negative feedback current flowng down lead 21A is now insufficient to cancel the positive input signal. Therefore, the output of amplifier 15A will rise and drive the actuator A, via motor 14A, even further towards the negative end of the potentiometers 28A and 25A. However, since wiper 27A is open circuit the motor will continue to run until wipers 27A and 25A reach the negative end of their potentiometers. As in the previously considered case, this causes actuator B to run nine-tenths of the way towards its positive end. Thereafter by virtue of the 9:10 ratio between the values of resistors 23 and 26, channel B operates at a gain of 1.9 times its normal value. Hence the system as a whole operates with a gain reduction of only 5 percent and a null position change of —5 percent. This state of affairs persists while the input sigal from 16, 17 is positive. If the input signal swings negatve, the null positive will change over from —5 percent to +5 percent (i.e. towards the positive ends of the potentiometers).

Another source of failure could be the cutting off of the source of positive power to a pair of potentiometers, for instance 28A and 25B. This would leave the system working normally while the wipers of the four potentiometers lie centrally or on the negative reaches of the potentiometers. When the wipers move to the positive reaches of the potentiometers, leads 21A and 22A will be deprived of current, there will be no feedback current to amplifier 15A, and motor 14A will drive actuator A hard over. As described before with reference to the case where one actuator has gone hard over and jammed at one end of its stroke, motor 14B will now be driven to compensate and will maintain the system approximately at null. The system will remain there unless there are any future very prolonged signals calling for the wipers to lie on the negative reaches of their potentiometers.

In the event of the wiper of a cross-coupled potentiometer becoming open-circuit (say wiper 24A of potentiometer 25A), the gain of actuator A will fall to 0.19 of its normal value and the gain of actuator B will rise by a factor of 1.9. The overall effect on the system will be an increase in gain of only about 5 percent. This state of affairs will apply after the capacitor 29 has discharged in the manner already referred to.

In the event of amplifier 15A not responding to an input signal and leaving actuator A at some offset from null, then actuator B will be driven to a nearly equal and opposite offset by virtue of the feedback signal it receives from potentiometer 25A by way of lead 21B. The result upon the system as a whole will be a fall in gain of 5 percent and a small change of the null position (never greater than .025" where the actuator has a typical stroke of ±0.5" about its centre, i.e. a total stroke of 1").

The types of partial system failure already described are considered as those most likely to occur, and bring about the following displays from indicator 30. If motor 14A runs away and causes actuator A to run to either end of its stroke and remain there, bar 31 goes hard over in direction and bar 32 hard over in the other. Warning lamp 35 gives its warning signal, that is to say, it lights and stays on without flickering for an appreciable time, indicating a consistent input signal to motor 14A. At the same time lamp 36 will light intermittently, indicating that the B channel is still in order and for the most part works in a state in which the input signal to motor 14B falls below the strength necessary to light 36. This indication tells the pilot to select the B channel alone and switch off A. Should wiper 27A go open circuit, indicator 31 returns to zero and stays there, and indicator 32 moves with noticeably larger amplitude than normal. The fact that the two actuators are now operating with gains that are different not only in magnitude but also in sign will not be apparent, since indicator 31 is necessarily stationary because of the open circuit at 27A. Should wiper 24A become open circuit indicators 31, 32 will always move in the same direction, as they do while the system as a whole is working normally, but 32 will move with much the greater amplitude. Should potentiometer power supply fail, the effect will be similar to that which follows one actuator running hard over. Should one amplifier fail to respond to signals, leaving its associated actuator at an offset from centre, one of the indicators 31, 32 will come to rest at an offset and the other will oscillate about an equal and opposite offset.

The duplex system as described so far depends on receiving reliable signals from the sensors 16, 17. However, failure or inaccuracy of any of the sensors, could cause different signals to be applied to the two channels A and B. To avoid this, the signals before being applied to amplifiers 15 are applied to the additional circuit of FIGURE 4. In effect, the circuit of FIGURE 4 averages the signals from 16A, 17A and 16B, 17B, and applies the resultant equally to both channels. Each sensor 16 or 17 has its output signal applied through a resistance to its associated channel and cross-coupled through an equal resistance to the other channel.

Should for instance one pair of sensors 16A and 17A cease to supply signals, the signal derived from sensors 16B and 17B will be applied equally to both channels. Although the signals so applied will be reduced, nevertheless the system will continue to operate with a reduced gain.

It will thus be seen that both actuators of a duplex system according to the present invention may sometimes remain in use, although at a reduced efficiency, in the face of failures that would necessitate the pilot switching off a normal duplex system and taking over with completely manual control. Other types of failure—for instance one actuator going hard over and jamming there— leave the pilot the choice of taking over completely manual control, of switching off the power supply to the defective channel and relying on the other actuator, or of leaving the entire automatic system switched on; in the latter case he will know that the automatic system will never oppose the movements he himself may make to the stick, although the authority of the automatic system will be less than before and might at times fall virtually to nil.

Another actuator system (not shown), similar to that illustrated, links the pilot's control stick 9 with mechanism (not shown) which operates to swivel the flaps 8 at nozzles 6 and 7 simultaneously and in opposite senses.

What is claimed is:

1. An actuator system including a pair of control amplifiers and an actuator mechanism comprising a pair of motive power driven, variable length actuating members respectively controlled by said control amplifiers and arranged in response to a control signal to vary the lengths thereof in the same sense and magnitude from respective zero signal datum positions, each actuator being provided with electrical displacement feedback signal generator means for providing a signal dependent upon the actuator length which in magnitude and sign is dependent upon the amount and direction of change in length of the actuator from a zero signal datum position, direct feedback circuits for supplying feedback signals from the feedback signal generator of one actuator as an input to the amplifier for the same actuator, and cross-feedback circuits for supplying a feedback signal in both cases from the feedback signal generator means of one actuator to the input of the amplifier for the other actuator, the signal derived from the feedback signal generator means being the only signal connected to and supplied by the cross-feedback circuits and being supplied in such polarity sense as to produce a change in length of one actuator in a direction to compensate for actuator displacement error in the other actuator whereby said actuator mechanism tends to maintain a datum position while excessive loading of the electrical circuit of an impaired actuator is prevented.

2. An actuator system as claimed in claim 1 in which the cross-feedback circuits provide a signal gain that is different from that provided in the direct feedback circuits.

3. An actuator system as claimed in claim 1 further including a pilot's control stick mechanically connected to both actuating members, a stick signal pickoff associated with the pilot's control stick for operation thereby and electrically connected to the input of the amplifiers of both members, and means for connecting the outputs of said actuating members to an aircraft control surface-operating device.

4. An actuator system for aircraft including a pair of control amplifiers and an actuator mechanism comprising a pair of actuators respectively controlled by said control amplifiers, said actuators being arranged in parallel relation and each actuator comprising a motive power driven, variable length, actuating member pivotally connected between an input link and an output link in the manner of a parallelogram, each actuator being provided with electrical displacement feedback signal generator means for providing a signal dependent upon the actuator length which in magnitude and sign is dependent upon the amount and direction of change in length of the actuator from a zero signal datum position, direct feedback circuits for supplying feedback signals from the feedback signal generator of one actuator as an input to the amplifier for the same actuator, and cross-feedback circuits for supplying a feedback signal in both cases from the feedback signal generator means of one actuator to the input of the amplifier for the other actuator, the signal derived from the feedback signal generator means being the only signal connected to and supplied by the cross-feedback circuits and being supplied in such polarity sense as to produce a change in length of one actuator in a direction to compensate for actuator displacement error in the other actuator whereby said actuator mechanism tends to maintain a datum position while excessive loading of the electrical circuit of an impaired actuator is prevented, a pilot's control stick mechanically connected to the input link of the actuator mechanism, a stick signal pickoff associated with the pilot's control stick for operation thereby and electrically connected to the input of the amplifiers of both actuators, and means for connecting the output link of said actuator mechanism to an aircraft control surface-operating device.

References Cited

UNITED STATES PATENTS

| 3,027,878 | 4/1962 | Keyt et al. |
| 3,070,071 | 12/1962 | Cooper. |
| 3,269,676 | 8/1966 | Hopkins. |

ORIS L. RADER, *Primary Examiner.*

THOMAS E. LYNCH, *Assistant Examiner.*

U.S. Cl. X.R.

244—77; 318—489